(No Model.)

C. A. SHAW & L. W. BUXTON.
COFFEE FILTER.

No. 383,916. Patented June 5, 1888.

Witnesses:
E. M. Skinney,
Thomas A. Tallon.

Inventors:
C. A. Shaw
Levi W. Buxton.
per C. A. Shaw & Co.
Attys.

UNITED STATES PATENT OFFICE.

CHARLES A. SHAW, OF BOSTON, MASSACHUSETTS, AND LEVI W. BUXTON, OF NASHUA, NEW HAMPSHIRE; SAID SHAW ASSIGNOR TO SAID BUXTON AND ISAIAH ROBBINS, JR., OF NASHUA, NEW HAMPSHIRE.

COFFEE-FILTER.

SPECIFICATION forming part of Letters Patent No. 383,916, dated June 5, 1888.

Application filed November 10, 1887. Serial No. 254,777. (No model.)

*To all whom it may concern:*

Be it known that we, CHARLES A. SHAW, of Boston, in the county of Suffolk, State of Massachusetts, and LEVI W. BUXTON, of Nashua, in the county of Hillsborough, State of New Hampshire, have invented a certain new and useful Improvement in Coffee-Filters, of which the following is a description sufficiently full, clear, and exact to enable any person skilled in the art or science to which said invention appertains to make and use the same, reference being had to the accompanying drawings, forming part of this specification, in which—

Figure 1:
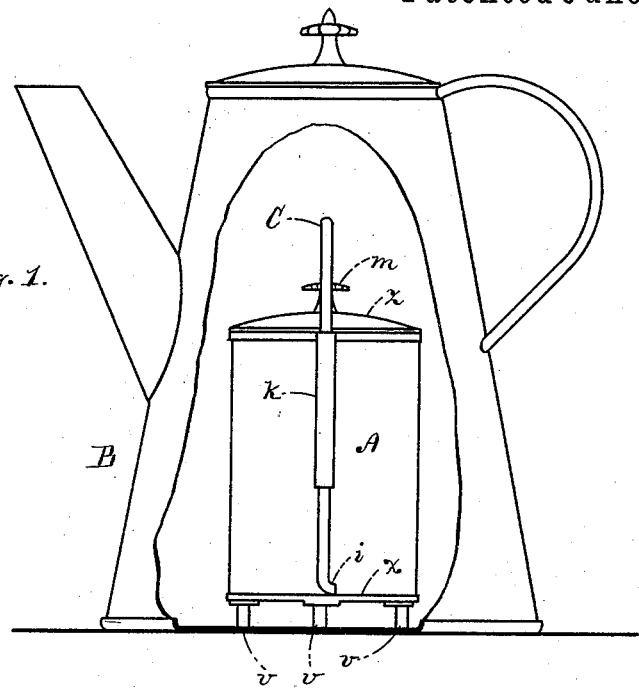
Figure 2:
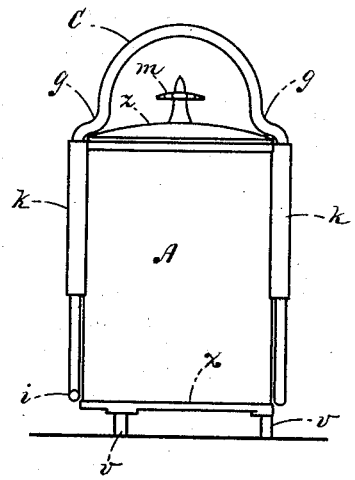
Figure 3:
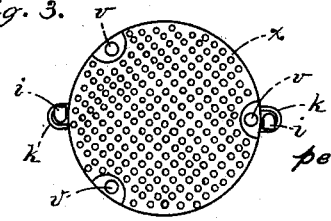

Figure 1 is a side elevation of our improved filter, represented in position for use in a coffee-pot, the side of the pot being shown as broken away; Fig. 2, a front elevation of the filter detached, and Fig. 3 a bottom plan view.

Like letters and figures of reference indicate corresponding parts in the different figures of the drawings.

Our invention is designed as an improvement upon the filter shown and described in Letters Patent of the United States, numbered 369,838, dated September 15, 1887; and it consists in a novel construction and arrangement of parts, as hereinafter more fully set forth and claimed, the object being to produce a more effective and otherwise desirable article of this character than is now in ordinary use.

The nature and operation of the improvement will be readily understood by all conversant with such matters from the following explanation.

In the drawings, A represents the body of the filter, and B the coffee-pot. The body of the filter is cylindrical in form, and preferably composed of tin, the bottom $x$ (see Fig. 3) being made of wire-cloth or perforated sheet metal. The top is closed by a tight-fitting cover, $z$, provided with a knob or handle, $m$. The body A is supported on three legs, $v$, secured to the bottom $x$ and equidistant from each other. To each side of the body A is secured a vertically-arranged metallic tube, $k$, and closely fitted to slide in said tube, so as to be adjustable therein, is a bail or handle, C, composed of an inverted-U-shaped piece of stout wire. The tubes $k$ extend from the top of the body A to a point about midway between said top and the bottom $x$, the ends of the bail C being bent laterally to form the stops $i$, for preventing it from being withdrawn from said tubes. The bail C is bent or curved inward at $g$, forming a projection at each side adapted to engage and retain the cover $z$ in position when the bail is forced downward through the tubes $k$ to its fullest extent, as shown in Fig. 2.

In the use of our improvement the requisite amount of tea or coffee is placed in the body of the filter A, and the cover $z$ secured thereon by forcing the bail C down through the tubes $k$ until the projections $g$ rest thereon. The filter is then placed in the pot B and the pot filled with water in the usual manner. The water circulates through the porous bottom $x$, and when the coffee is sufficiently leached the filter containing the "grounds" is removed from the pot by the bail C. The liquid tea or coffee made in this manner may be kept in a heated condition for an indefinite time without becoming dark-colored or bitter, as often happens when the coffee is inclosed in a cloth, which is difficult to remove or is left loose in the liquid in the ordinary manner.

Having thus explained our invention, what we claim is—

The combination of a body provided with bail-tubes on its opposite sides, a bail extending through said tubes in frictional contact therewith, and provided with stops at its lower end for engaging, when in raised position, the lower ends of said tubes, said bail being bent inward above said tubes, forming shoulders which shut over the edges of the cover for holding it in closed position, substantially as described.

CHARLES A. SHAW.
LEVI W. BUXTON.

Witnesses as to C. A. Shaw:
  E. M. SPINNEY,
  O. M. SHAW.

Witnesses as to L. W. Buxton:
  E. B. GOULD,
  B. B. WHITTEMORE.